Sept. 30, 1969   G. NISHIKATA   3,469,320
STRAIGHT-MOVING MICROMETER
Filed Nov. 13, 1967

Inventor
GORO NISHIKATA

By Holcombe, Wetherill Brisebois
Attorneys ns # United States Patent Office 3,469,320
Patented Sept. 30, 1969

3,469,320
STRAIGHT-MOVING MICROMETER
Goro Nishikata, Kawasaki, Japan, assignor to Yehan
Numata, Yokohama, Japan
Filed Nov. 13, 1967, Ser. No. 682,314
Claims priority, application Japan, Mar. 4, 1967,
42/17,926
Int. Cl. G01b 3/18
U.S. Cl. 33—166                                    5 Claims

ABSTRACT OF THE DISCLOSURE

A micrometer characterized by the fact that the spindle moves longitudinally without being rotated and the amount of movement is read from a scale plate and a thimble-type vernier scale; wherein, an internally threaded cylinder engages the threads on the spindle, and external threads on the cylinder engage a gear which drives the scale plate.

DESCRIPTION

The object of this invention is to provide a micrometer equipped with a spindle which can move axially without being rotated. In this invention the spindle is made integral with an externally threaded screw and it is not connected with any other member except an internally threaded cylinder. In a conventional micrometer with one end of its spindle fixed to the thimble, it has been necessary to make part of the spindle rotatable and this has made the construction complex and the cost high.

Another object of this invention is to provide a micrometer equipped with a scale plate which rotates with the movement of the internally threaded cylinder which moves the spindle. While there is one conventional micrometer in which the figure-bearing pieces are rotated by the counter, it is more complicated in structure and expensive than mine.

Figure 1:
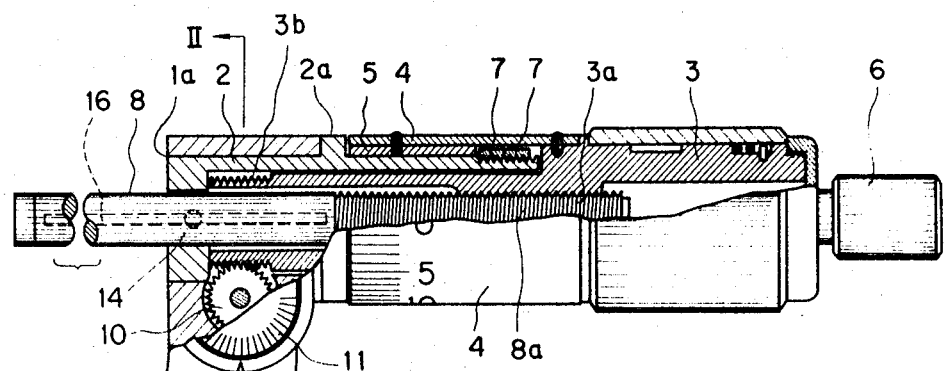
Figure 2:
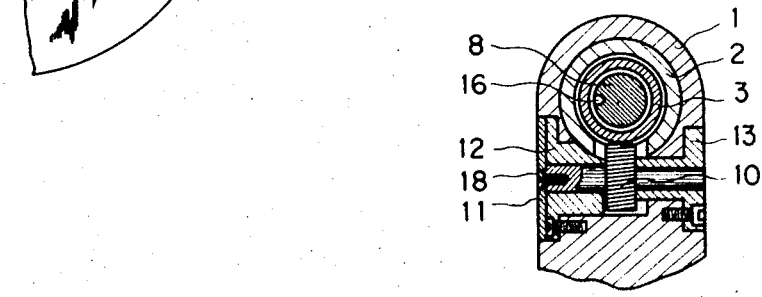

A preferred embodiment of this invention will now be described with reference to the accompanying drawings, in which:

FIGURE 1 is a partial side view of the micrometer according to this invention partially in section; and FIGURE 2 is a sectional view taken along the line II—II of FIGURE 1.

The frame 1 is provided with an anvil (not shown) since this portion of the frame, to the left of the figure, has been broken away. A hole 1a, in the frame 1 receives one end of an inner cylinder 2, having a flange 2a abutting said frame 1. A loose-fitting cylinder 3 mounted within the cylinder 2 is internally threaded at 3a and externally threaded near one end at 3b.

The cylinder 3 is free to rotate within the cylinder 2 and fixed to the sleeve 4 which is fitted to the collar 5, the axial sliding movement of which is restricted by the nut 7 on the inner cylinder. Consequently, the cylinder 3 cannot move in an axial direction relative to the cylinder 2, but is freely rotatable with respect thereto. A spindle 8 with external threads 8a is mounted coaxially within the cylinder 3, with said external threads 8a engaging the internal threads 3a of the cylinder 3.

The spindle 8 is provided with a longitudinal groove 16 which receives the key 14 carried by the frame 1, thus allowing the spindle 1 to move in an axial direction only.

The helical gear 10 is mounted to turn freely within the frame 1, in engagement with the external threads 8a on the spindle 8.

The shaft of the said helical gear 10 carries a scale disk 11 fastened in place by the screw 18, so as to be readable from the outside. 12 and 13 are the bearings supporting the shaft of the helical gear 10; and 6 is a knob attached to the cylinder 3.

Rotation of the cylinder 3 by the knob 6 causes the internal threads 3a of the cylinder 3 to move the spindle, while at the same time causing the male threads 3b to rotate the helical gear 10. The spindle can thus be moved toward or away from the anvil. By holding the object to be measured between the spindle tip and the anvil, you can get a reading in units such as centimeters from the scale disk 11 and get fractional readings, in millimeters for example, from the scale on the sleeve 4.

Since in this invention the helical gear 10 is directly driven by the cylinder 3, there is less backlash than when said gear is indirectly driven by means of a rack or screw on the spindle, thus assuring accurate, rapid operation.

In operation, the frame is held in one hand and the knob rotated by the other. This rotates the cylinder 3, thus causing axial translation of the spindle at the same time the scale 11 is rotated.

What is claimed is:

1. A micrometer comprising a frame, a hollow cylinder mounted within said frame for rotational movement about its longitudinal axis, threads on the internal surface of said cylinder, a spindle having mating external threads near one end thereof and coaxially mounted within said cylinder for axial sliding movement relative thereto while the other end of said spindle projects from said frame and cylinder to contact an object to be measured, means restraining said spindle against rotational movement and said cylinder against axial movement, external threads on said cylinder, and a disk scale driven by gearing engaged by said last-mentioned threads.

2. A micrometer as claimed in claim 1 comprising an indicium on said frame which cooperates with said scale to give a gross indication of the position of said spindle.

3. A micrometer as claimed in claim 2 comprising an exposed cylindrical scale carried by said cylinder which gives a fine indication dependent upon the position of said spindle.

4. A micrometer as claimed in claim 1 comprising an anvil carried by said frame and positioned in alignment with said spindle.

5. A micrometer as claimed in claim 1 in which the means preventing rotation of said spindle is a pin fixed to said frame which cooperates with a longitudinal slot in said spindle.

References Cited

UNITED STATES PATENTS

| | | |
|---|---|---|
| 890,287 | 6/1908 | Londick. |
| 1,021,384 | 3/1912 | Smith. |
| 2,441,317 | 5/1948 | Gribble. |
| 3,120,061 | 2/1964 | Pfleiderer. |

WILLIAM D. MARTIN, Jr., Primary Examiner